United States Patent [19]

Takeuchi

[11] Patent Number: 4,951,897
[45] Date of Patent: Aug. 28, 1990

[54] DRAG MECHANISM FOR A SPINNING REEL

[75] Inventor: Shinji Takeuchi, Tokyo, Japan

[73] Assignee: Daiwa Seiko, Inc., Tokyo, Japan

[21] Appl. No.: 385,924

[22] Filed: Jul. 27, 1989

Related U.S. Application Data

[63] Continuation of Ser. No. 174,409, Mar. 28, 1988, abandoned.

[30] Foreign Application Priority Data

Mar. 27, 1987 [JP] Japan ............................ 62-45108[U]

[51] Int. Cl.⁵ ............................................ A01K 89/027
[52] U.S. Cl. .................................................. 242/246
[58] Field of Search ........................ 242/246, 290, 303; 464/45, 46, 47

[56] References Cited

U.S. PATENT DOCUMENTS

| 3,144,217 | 8/1964 | Wood | 242/84.21 R |
|---|---|---|---|
| 4,005,832 | 2/1977 | Yamazaki | 242/84.21 R |
| 4,196,869 | 4/1980 | Shepherd | 242/84.21 R |
| 4,416,428 | 11/1983 | Noda | 242/84.21 R |
| 4,549,702 | 10/1985 | Councilman | 242/84.5 A |

FOREIGN PATENT DOCUMENTS 614837 12/1948 United Kingdom .

Primary Examiner—Katherine A. Matecki
Attorney, Agent, or Firm—Cushman, Darby & Cushman

[57] ABSTRACT

An improved drag mechanism for a spinning reel with a spool shaft that may be secured to the body of the reel, a spool having an outer fishline winding surface, a recessed rear portion supported for rotation on the spool shaft by a bearing, and a plurality of drag members disposed within the recessed rear portion between the bearing and a flange portion of the spool shaft. The drag members have an outer diameter that is greater than the outer diameter of the fishline winding surface of the spool, which provides a smooth, even braking effect.

4 Claims, 2 Drawing Sheets

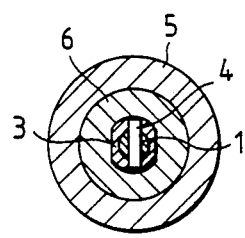
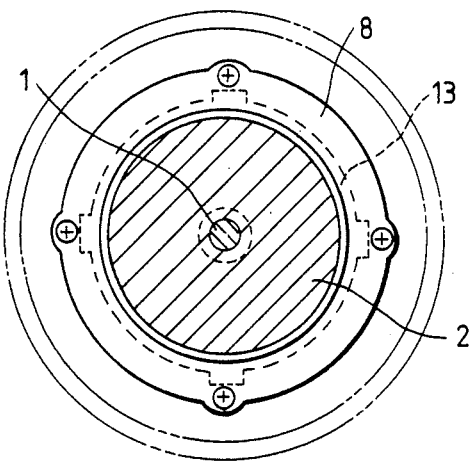
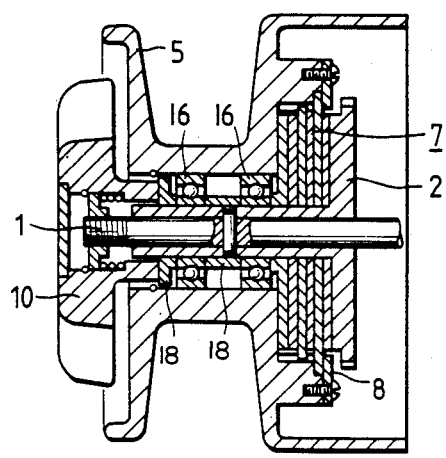
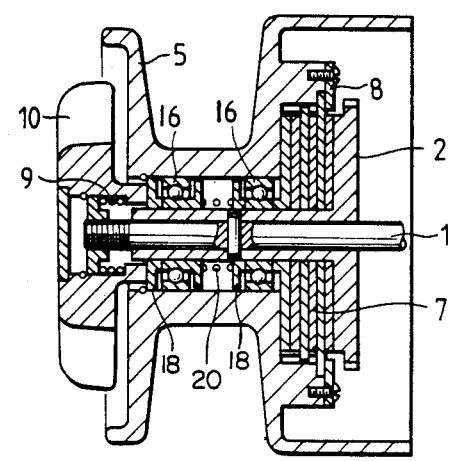

DRAG MECHANISM FOR A SPINNING REEL

This is a continuation of application No. 07/174,409, filed March 28, 1988, which was abandoned upon the filing hereof.

BACKGROUND OF THE INVENTION

1. Field of the Invention

The present invention relates to an improved drag mechanism for governing the frictional resistance of a spinning reel against rotation. More specifically, the present invention relates to an improvement to a drag mechanism for a spinning reel of the type that utilizes a plurality of drag members to provide a braking force to the reel.

2. Description of the Prior Art

A spinning reel which is used for fishing commonly has a rotation spool on which fishing line may be wound provided on a shaft that is secured to the body of the fishing reel. In order to facilitate smoother rotation of the spool during winding of the reel, it is known to provide a drag mechanism for frictionally engaging the spool so that line will play out when a fish runs.

The most common type of drag mechanism for a spinning reel which was employed in the prior art is that of the front location type in which drag members are provided in a recess that is formed in a front portion of the spool. However, the pressure of a fish line on this type of prior art spool acts to deform the front plate of the spool, so the braking force of the drag mechanism is dependent on the quantity of fish line wound on the spool.

Another prior art drag mechanism, in which a plurality of drag members were provided in a first group in a front portion of a spool, and in a second group at the rear portion of a spool was disclosed in U.S. Pat. No. 4,549,702. However, since some of the drag members in this device were provided in the front portion of the spool, the braking force of the drag mechanism was still dependent on the amount of fish line wound on the spool.

In addition, since the drag members in the latter mentioned device must be provided in the front and rear portions of the spool, the construction of the device is relatively complicated, which increases manufacturing cost and makes the apparatus relatively difficult to assemble and disassemble. Moreover, since the drag adjustment knob in the latter mentioned device is provided near the drag members located in the front portion of the spool, the knob was likely to loosen due to the vibration caused by the drag members. Clearly, there has existed a long and unfilled need in the prior art for a spinning reel drag mechanism that provides a smooth constant braking force and that is relatively simple in construction.

SUMMARY OF THE INVENTION

Accordingly, it is an object of the present invention to provide a drag mechanism for a spinning reel that provides a smooth, constant braking force to the spool and is relatively simple in construction.

Specifically, the present invention provides an improved drag mechanism for a spinning reel, which includes a spool shaft that may be secured to the body of the reel, a spool having an outer fish line winding surface and a recessed rear portion supported for rotation on the spool shaft by a bearing, and plurality of drag members disposed within the recessed rear portion between the bearing and a flange portion of the spool shaft. According to the present invention, the drag members have an outer diameter that is greater than the outer diameter of the fish line winding surface of the spool, which provides a smooth, even braking effect.

The bearing is provided in front of the flange portion of the spool shaft so that the bearing may be rotated together with the spool shaft and can optionally be moved in the axial direction thereof relative to the spool shaft. In this way, the drag members are pinched between the bearing and the flange portion so as to provide a braking force to the spool. Since the drag members are provided in the rear portion of the spool rather than the front portion, the braking force of the drag mechanism remains stable regardless of the winding pressure of the fish line wound on the spool. Moreover, since the drag members are provided near the rear portion of the spool their movement will not loosen the drag adjustment knob for the braking mechanism, which is preferably located near the front portion of the spool on the spool shaft.

Other objects, features and characteristics of the present invention, as well as the methods and operation and functions of the related elements of the structure and to the combination of parts and economies of manufacture, will become apparent upon consideration of the following description and the appended claims with reference to the accompanying drawings, all of which form a part of this specification, wherein like reference numerals designate corresponding parts in the various figures.

BRIEF DESCRIPTION OF THE DRAWINGS

FIG. 2 illustrates a sectional view of the reel of FIG. 1;

FIG. 3 illustrates a sectional view of the reel in FIG. 1;

FIG. 4 illustrates a longitudinal sectional view of a major part of a second embodiment of the present invention; and FIG. 5 shows a longitudinal, sectional view of a major part of a third embodiment of the present invention.

DETAILED DESCRIPTION OF THE PREFERRED EMBODIMENT

Figure 1:
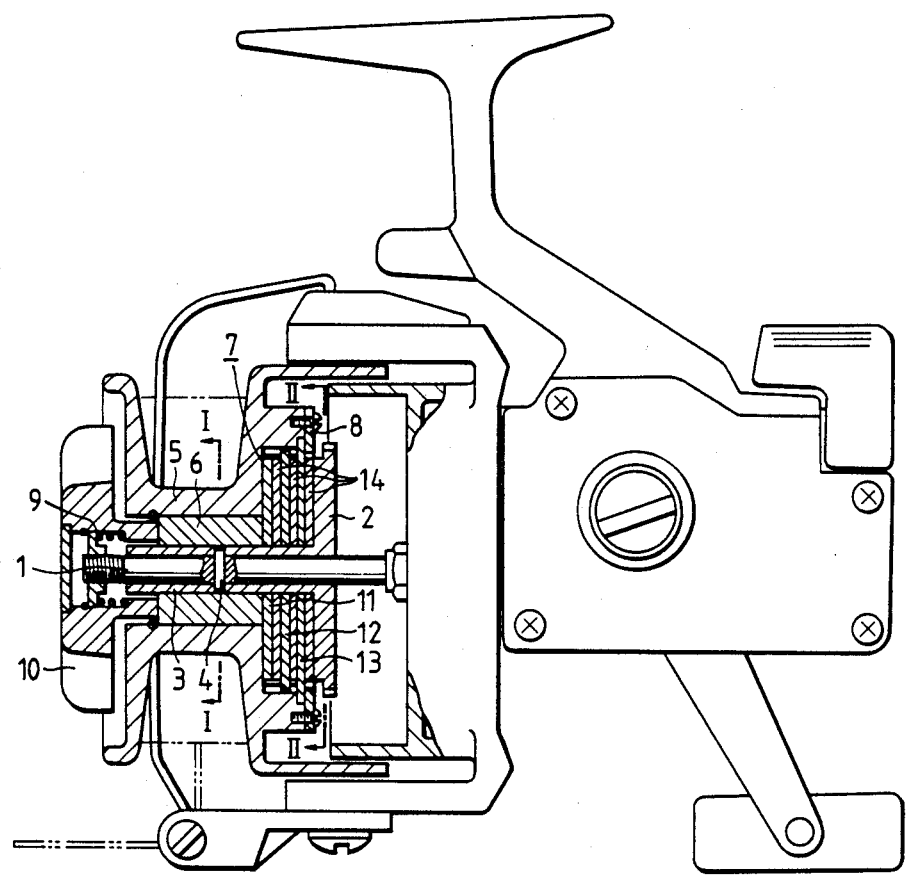
FIG. 1 is a cutaway side view of a first embodiment of the present invention.

Referring to FIGS. 1-3, a first embodiment of the present invention includes a quill 3 having a flange 2 which is secured by a pin 4 to the front portion of a spool shaft 1 of a spinning wheel, which may be slid back and forth in a conventional manner. A bearing member 6 is mounted on the quill 3 so that the bearing member can be moved only in the axial direction relative to the quill and supports for rotation a spool 5 that is mounted thereon.

A plurality of drag members 7, which have an outside diameter that is larger than the fishline winding portion of spool 5, are provided in a recessed rear portion of the spool so that the rearmost drag member is located in contact with the flange 2 and the forward-most drag member bears against a rear surface of bearing member 6. As illustrated in FIG. 3, a retaining means such as a stop plate 8 is integrally mounted to the spool to prevent the drag members from coming out of the recessed rear portion of the spool 5.

As shown in FIG. 1, a drag adjustment knob 10 is screw-engaged on a tip portion of the spool shaft 1 and is fitted with a spring 9 so that the knob is located in contact with the front end of the bearing member 6, and can be moved back and forth to bring the drag members 7 into contact with the spool 5 through the action of bearing member 6 to adjust the braking force that is applied to the spool by the drag members.

The drag members 7 preferably include a first drag member 11 that is engaged on the quill 3 so as to be movable in the axial direction thereof, a second drag plate 12 and a third drag plate 13 that is secured so as to be integral with the spool 5, as is shown in FIG. 3. As is shown in FIG. 1, spacers 14 are interposed between the first, second and third drag members.

FIG. 4 illustrates a second embodiment of the present invention wherein bearing member 6 is comprised of a plurality of ball bearings 16 and collars 18. Other than the modification of the bearing, the embodiment of FIG. 4 is identical in all other respects with the embodiment of the present invention that is illustrated in FIGS. 1–3.

FIG. 5 illustrates a third embodiment of the present invention wherein a spring 20, whose resilient force is stronger than the spring 9 which is provided for the drag adjustment knob 10, is provided between ball bearings 16' to widen the range of adjustability of the braking force that may be applied to the spool 5. In all other respects, the embodiment of the present invention illustrated in FIG. 5 is identical to that of the embodiment illustrated in FIGS. 1–3.

The operation of all three embodiments of the present invention will now be discussed. When the drag adjustment knob 10 is turned in one direction, the bearing member 6 pushes drag members 7 toward the flange 2 of the quill 3 to brake the rotation of spool 5 depending on the displacement of the knob 10. When the drag adjustment knob 10 is turned oppositely, the pinching of the drag members 7 between the flange 2 of the quill 3 and the bearing member 6 is reduced, which reduces the drag force that is applied to the spool 5.

Since the drag members 7 in the present invention have a larger outside diameter than the fishline winding portion of the spool 5, a stronger, more constant braking force may be applied to the spool 5 that does not need to be adjusted when the amount of fishline that is wound on the spool changes. For all of the above reasons, a drag mechanism for a spinning wheel that is constructed according to the present invention has at least four practical advantages over the above discussed prior art drag mechanisms, which are:

1. The braking force applied to the spool is not affected by the tension applied to the spool by the fishline, even if the tension causes the front plate of the spool to deform.

2. A drag mechanism constructed according to the present invention is easy to manufacture, to assemble and to disassemble.

3. The diameters of the drag members and a drag mechanism constructed according to the present invention can be made large enough to apply a relatively strong braking force.

4. Since a sufficient distance is provided between the drag adjustment knob and the drag members in a drag mechanism constructed according to the present invention, the vibration transmitted to the knob by the drag members is negligible, and will not cause the knob to loosen as in prior art devices.

While the invention has been described in connection with what is presently considered to be the most practical and preferred embodiment, it is to be understood that the invention is not limited to the disclosed embodiment, but, on the contrary, is intended to cover various modifications and equivalent arrangements included within the spirit and scope of the appended claims.

What is claimed is:

1. An improved drag mechanism for a spinning reel comprising:
    a spool shaft having a front end and a rear end and a flange portion formed at said rear end thereof;
    bearing means mounted axially movably on said spool shaft;
    spool means rotatably supported on said bearing means for winding a length of fishline thereon, said spool means having a fishline winding portion with a first outside diameter and a recessed rear portion;
    a plurality of drag members, having a front end and a rear end and disposed around and in contact with said spool shaft and in said recessed rear portion of said spool means between said bearing means and said flange portion, each of said drag members having an outer diameter which is larger than the first outside diameter of said fishline winding portion;
    a manually operable drag adjustment knob on said spool shaft, said knob operatively engaging said bearing means for applying a variable axial force to said bearing means, the amount of force varying the braking force of said drag members, said drag members being disposed to contact said bearing means at the front end thereof and said flange at the rear end thereof when a braking force is applied to said drag members;
    means on said spool means for retaining said drag members within said recessed rear portion;
    a first biasing means for resiliently biasing said drag adjustment knob relative to said spool shaft;
    and wherein said bearing means comprises at least two collars surrounding said spool shaft and a plurality of ball bearings, and a second biasing means for resiliently biasing one of said collars relative to another of said collars.

2. Apparatus according to claim 1, wherein said retaining means comprises a stop plate secured to said spool means.

3. Apparatus according to claim 1, wherein at least one of said drag members is integral with said spool means.

4. Apparatus according to claim 1, wherein said spool shaft has a threaded outer surface on the front end thereof, and said drag adjustment knob has a tapped inner bore for mating with said spool shaft.

* * * * *